A. E. OSBORN.
TRANSMISSION GEARING.
APPLICATION FILED NOV. 16, 1912.
1,213,531.
Patented Jan. 23, 1917.
2 SHEETS—SHEET 2.
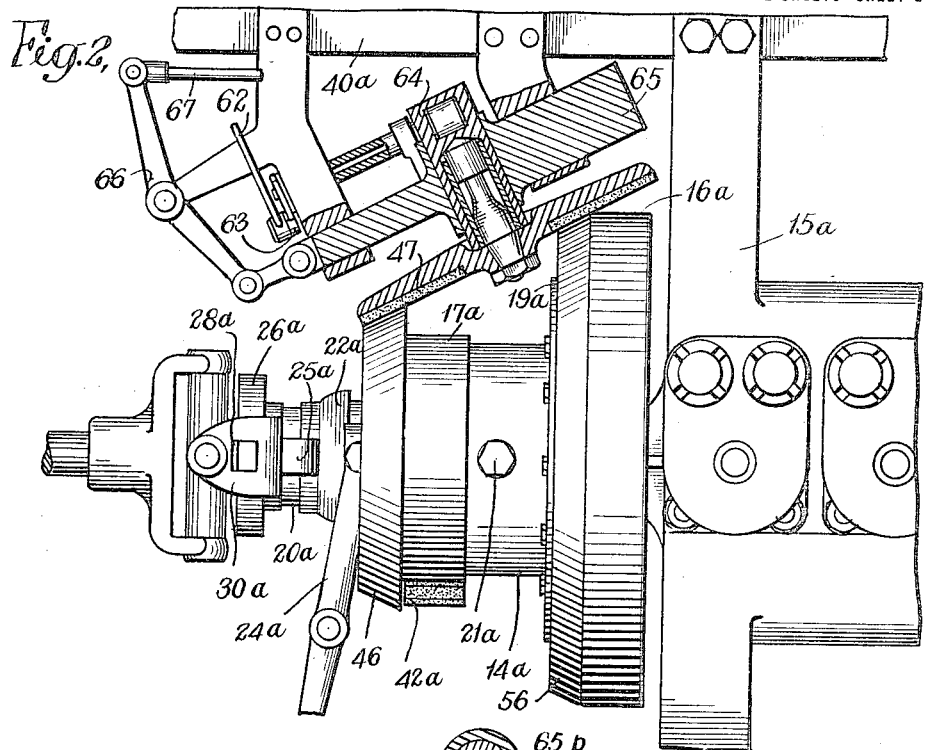
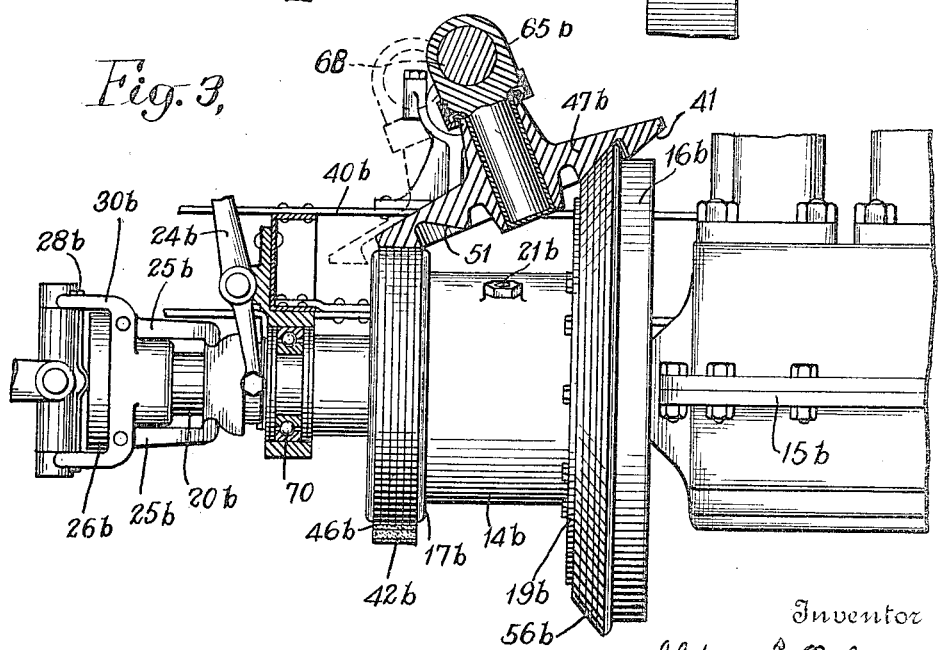
Inventor
Alden E. Osborn.

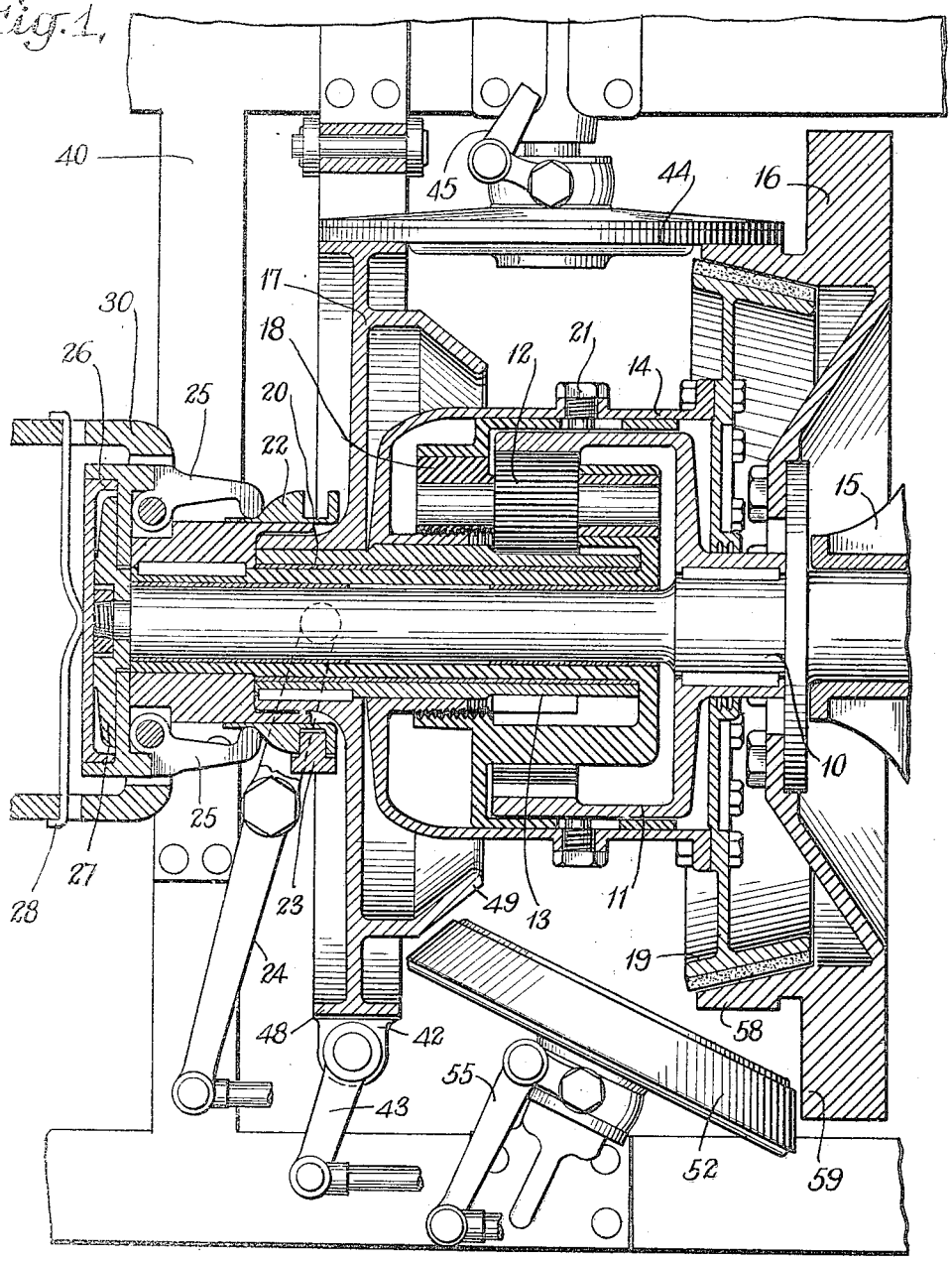

UNITED STATES PATENT OFFICE.

ALDEN E. OSBORN, OF NEW YORK, N. Y.

TRANSMISSION-GEARING.

1,213,531.　　　　Specification of Letters Patent.　　Patented Jan. 23, 1917.

Application filed November 16, 1912.　Serial No. 731,770.

*To all whom it may concern:*

Be it known that I, ALDEN E. OSBORN, of the city of New York, borough of the Bronx, county and State of New York, have invented certain new and useful Improvements in Transmission-Gearing, of which the following is a full, clear, and exact description, such as will enable others skilled in the art to which it appertains to make and use the same.

My invention relates to a gearing for transmitting motion at varying speeds in opposite directions at the will of the operator.

In my Patent No. 995,552 dated June 20, 1911, there is shown a transmission gearing in which a planetary gear system is arranged for certain speeds while an auxiliary driving device, driving the restrainable gear mount of said planetary system independently of the planetary gears, is employed for another speed and the principal object of my present invention is to provide certain arrangements of these auxiliary driving means which will give said mount (still independently of the planetary gears) two or more different speeds.

Another object is to provide an advantageous arrangement of certain details of a planetary gear and locking or high speed clutch (to be hereinafter described and claimed) which while particularly adapted to this special form of transmission gearing may also be embodied in other types of planetary gears.

This invention is especially adapted for use with motor vehicles but is in no sense limited to this use.

Reference is to be had to the accompanying drawing in which,

Figure 1 represents a partial sectional plan view of one form of my invention; Fig. 2 represents a partial sectional plan view showing a modified arrangement of certain of the parts of Fig. 1 and Fig. 3 represents a partial sectional side elevation of a still further modification of certain of the parts of Fig. 1.

Referring first to Fig. 1, 10 indicates the driving member or prime mover of the gearing hereinafter termed the driving element and 20 indicates the part which is rotated by the gearing and is hereinafter termed the driven element. The driving element 10 is shown as the shaft extension of the motor or engine 15 and carries the fly-wheel 16 and the internal driving gear 11. This gear 11 meshes with the pinion 12 which is carried by the driven element 20 eccentric to the axis of rotation of said element and in turn meshes with the central gear 13 attached to the gear mount or drum 17 which is in this particular form of my invention, provided with two frictional contact surfaces 48 and 49. The driven element 20 is so formed that part of it passes between the gears 11 and 13, this part being cut away around the pinion 12, and the extension of this part is threaded so as to fit the threaded hub of the inclosing casing 14 in such a manner that this casing can be rotated forward or backward on this thread and its distance from the fly-wheel 16 readily adjusted. The threaded parts are also made of sufficiently large diameter to permit the removal of the gear 13 through the opening in the driven element 20 when the casing 14 is detached. The pinion 12 can also be removed by detaching this casing 14 as the driven element 20 is provided with a hub of sufficient size to contain a bushing 18, of larger diameter than the pinion, which bushing is cut away on one side and threaded to admit the threaded hub of the casing 14 so that when the casing is removed the bushing retaining the pinion is also released. The forward end of the casing 14 is inclosed and made oil tight by the clutch member 19 which is shown with a cone friction surface adapted to engage with the fly-wheel 16. In order to cause the clutch member 19 and casing 14 to rotate with the driven element 20 suitable locking studs 21 are shown which pass through the casing and engage slots in a part of the driven element. These studs when removed also permit the oiling of the parts within the casing.

It will be seen that the clutch can be adjusted in a very simple manner by removing the locking studs 21 and rotating the casing 14 around the driven element 20 until the desired adjustment has been obtained. In order to operate the clutch suitable means is provided whereby the driven element 20 and parts carried thereby can be moved a short distance along the driving element or shaft 10. This means consists of the cone spool 22 operated by the collar 23 and lever 24 mounted on the vehicle frame 40 which spool 22 expands the clutch dogs 25 on the driven element extension 30 so as to cause them to press on the thrust ring 26 and force said ring against the washer 27 attached to the driving element 10 and thus force the driven element 20 and parts in the opposite direction toward the fly-wheel 16. In order to draw the driven element and parts away from the fly wheel to free the clutch a suitable flat spring 28 is provided although other means to accomplish the same purpose can be employed.

The external means provided by my invention for obtaining certain of the speed ratios will now be described:—These means consist in the form of my invention shown in Fig. 1 of:—1st. A suitable brake shoe or band 42 mounted on the vehicle frame 40 and operated by the lever 43 and adapted to hold the gear mount or drum 17 by pressure on its surface 48. 2nd. A suitable friction disk 44 rotatably mounted on the vehicle frame 40 and arranged so that it can be slid into engagement (as shown) by means of the lever 45 with the friction contact surface 58 on the fly-wheel 16 and the friction contact surface 48 on the drum 17 and 3rd. a suitable friction disk 52 rotatably mounted on the vehicle frame 40 and arranged so that it can be slid into engagement, by means of the lever 55 with friction contact surface 59 on the fly-wheel 16 and the friction contact surface 49 on the drum 17. The relative sizes of the surfaces 48 and 58 are such that when the disk 44 is engaged the drum 17 would revolve backward at about the same speed that the driving member is turning, while the relative sizes of the surfaces 49 and 59 are such that when the disk 52 is engaged with them the drum 17 would be revolved (also backward) but at a much higher speed than the driving member turns.

The operation of this form of my transmission gearing is as follows:—When the clutch member 19 is disengaged from the fly-wheel 16 (as shown) and the brake 42 and friction disks 44 and 52 are clear of all their respective contact surfaces the rotation of the driving element 10 causes the internal gear 11 to turn the pinion 12 and drive the gear 13 and drum 17 in a reverse direction and faster than the driving element but without communicating motion to the driven element 20. If now the disk 44 be forcibly engaged with the surfaces 48 and 58 the drum 17 will still turn backward but its speed will be less than the speed at which it revolves idly or about the same speed as the driving element 10 resulting, by reason of the gear 12 being larger than the gear 13, in a slow forward rotation being given to the driven element 20. This constitutes the lowest or first forward speed of the transmission.

If, instead of the disk 44 being applied to its co-acting surfaces, the brake 42 is applied to the surface 48, thus restraining the drum 17 from all motion, the driven element 20 would be revolved in the same direction as the driving element 10 but at a faster speed than is obtained in the foregoing case. This constitutes the intermediate or second forward speed. If instead of this brake 42 or the disk 44 being applied the clutch operating spool 22 is moved so as to spread the clutch dogs 25 and move the driven element 20 to forcibly engage the clutch member 19 with the fly-wheel 16 the whole organized gearing will be locked together and the driven element revolved solidly with the driving element. This is the third or highest speed.

If the clutch and brake and just mentioned disk are all released and the disk 52 applied, by means connected with the lever 55, to the surface 49 of the drum or gear mount 17 and the surface 59 of the fly-wheel 16 the drum 17 and gear 13 will be revolved in the opposite direction to the driving element 10 but at a still faster speed than with the disk 44 in engagement and if the diameter of the surface 59 is sufficiently larger than that of the surface 49, the drum 17 will be driven backward faster than it is rotated when driven by the gears 11, 12 and 13 alone, resulting in a backward rotation of the driven element 20 at a speed dependent on how much faster the drum 17 is turned backward than it would be driven by the gears alone as well as their relative sizes. This is the reverse speed of the transmission mechanism.

From the foregoing it will be seen that while I prefer to use the special arrangement of the gears 11, 12 and 13 the casing 14, the drum 17, and the clutch members and other connected parts of this transmission mechanism as shown in this Fig. 1 and as hereinafter claimed, various modifications can obviously be made in the arrangement of these connected parts while still the principle involved in obtaining the different speeds remains the same as above set forth. It will also be noticed that an advantage of the particular arrangement of clutch parts and driving member shown in this Fig. 1 is that with the clutch in engagement on the high speed all the power is transmitted from the driving member to the driven member without subjecting the gears to any of the driving pressure.

In Figs. 2 and 3 are shown modifications of Fig. 1 relating to the parts exterior to the gear casing 14 of Fig. 1 the parts within the casing, which in Figs. 2 and 3 is marked as 14$^a$ and 14$^b$, being presumed to be arranged the same as in Fig. 1 while the drum 17$^a$ and 17$^b$ corresponds to the drum 17 of Fig. 1—the spool 22$^a$ and 22$^b$ corresponds to the spool 22, &c.

In Fig. 2 the drum 17$^a$ and fly-wheel 16$^a$ are each provided with one friction contact surface 46 and 56 respectively adapted to engage the frictional contact surface of the disk 47. This disk is mounted to rotate on a carrier 65 which latter is supported on the vehicle framing 40$^a$ so that it can slide parallel with the face of the friction surfaces 46 and 56 and is controlled in this sliding motion through the lever 66 and rod 67. The disk 47 is also so mounted in the carrier, by means of the sliding bearing 64 which is actuated by lever 63 and rod 62, that it can be brought, when desired, into contact with the friction contact surfaces 46 and 56. With this type of my invention the second and third speeds are obtained (with the disk 47 disengaged) exactly as in the previously described form while the first speed and reverse are obtained by means of the sliding disk 47 which serves the purpose of the two independent disks 44 and 52 of Fig. 1 by sliding it parallel with the friction contact surfaces 46 and 56 to give different distances between its axis of rotation and one or the other of said friction contact surfaces. Thus with the center of rotation of the disk 47 near the fly-wheel surface 56, as shown, the drum 17$^a$ would be given a backward motion higher than is given it by the gears and the driven element 20$^a$ would be turned backward whereas, if the axis of the disk 47 is near to the drum surface 46 this drum would be given a slower backward motion than it is given by the gears and consequently the driven element 20$^a$ would revolve in a forward direction at a low speed. It will be noticed that it is possible to apply the disk 47 to the surfaces 46 and 56 when its axis is in such a position that there would not be any change in the speed of the drum 17$^a$ from that at which it is driven by the gears thus transmitting no movement to the driven member 20$^a$ and causing, when the disk is thus applied, the transmission to act as an effective vehicle brake. It will also be noticed that the disk may also be applied in other positions between this neutral one and the two extremes mentioned above with the result that special and very large reduction in the gear ratio may be obtained for extraordinary conditions.

In Fig. 3 is shown a further modification having only a single disk 47$^b$ and being somewhat similar to the form of my invention just described excepting for a different mounting for this disk. The disk may have a flat contact surface as in Fig. 2 but it is shown, as it has in this form of my device only two positions for its axis, as provided with two independent cone friction contact surfaces: 41 and 51. It is rotatively mounted on a carrier 65$^b$ which is in turn pivoted on the eccentric pin of the cross shaft 68 which is mounted in bearings on the vehicle frame 40$^b$ with its axis at right angles to the other transmission shafts. This shaft 68 can by suitable means within control of the operator be swung through an arc (as shown by the dotted lines) sufficient to bring either the surface 51 into contact with the surface 56$^b$ and the surface 41 into contact with the surface 46$^b$ or the surface 41 into contact with the surface 56$^b$ and the surface 51 into contact with the surface 46$^b$. It is obvious that when the surface 51 is in contact with 56$^b$ and the surface 41 in contact with 46$^b$ as shown, the drum or gear mount 17$^b$ would be turned backward at a high speed and the reverse obtained while, when the surface 41 is in contact with 56$^b$ and 51 in contact with 46$^b$, the drum 17$^b$ would be turned backward at a lower speed and the first or lowest speed of transmission would be obtained. With this form of my device only one operating connection to the shaft 68 is required to both bring the disk 47$^b$ into the different positions and to apply the driving pressure onto the contact surfaces. It will be observed that with this form of my transmission mechanism I have shown a bearing 70 mounted on the vehicle frame 40$^b$ and surrounding and supporting the driven member 20$^b$—the main part of the gear being otherwise the same as shown in Fig. 1. The necessity for such a bearing is dependent upon the direction and amount of the driving and friction pressure caused by the friction disk or disks and the strength of the driving shaft or member and other parts and it may or may not be used according to the circumstances.

Having thus described my invention what I claim as new is:—

1. In a transmission gearing the combination of a gear system, a movable mount having connection with an element thereof, means for restraining at will the motion of the mount and controllable means for positively driving the mount independently of the action of the gear system and at two or more different speeds.

2. In a transmission gearing the combination of a gear system, a movable mount having connection with an element thereof, means for restraining at will the motion of the mount, and controllable means mounted independently of the gearing for positively driving the mount at two or more different speeds.

3. In a transmission gearing the combination of a gear system, a movable mount having connection with an element thereof, means for restraining at will the motion of the mount, and controllable means mounted independently of the gearing for positively driving the mount similarly to the action of the gear and at both a higher and a lower speed.

4. In a transmission gearing the combination of driving and driven elements, a movable mount, a gear system having one element thereof connected with the driving element, a second element thereof connected with the driven element and a third element thereof connected with the movable mount, means for restraining at will the motion of the mount, and means for positively driving the mount from the driving element separately from the action of the gear system at both a higher and a lower speed.

5. In a transmission gearing the combination of driving and driven elements, a movable mount, a gear system having one element thereof connected with the driving element, a second element thereof connected with the driven element and a third element thereof connected with the movable mount, means for restraining at will the motion of the mount, and means for positively driving the mount from the driving element separately from the action of the gear system and at the same speed as it is given by the action of the gear system or a speed either lower or higher than it is given by said gear system's action.

6. In a transmission gearing the combination of driving and driven elements, a movable mount, a gear system having one element thereof connected with the driving element, a second element thereof connected with the driven element and a third element thereof connected with the movable mount, means for restraining at will the motion of the mount and an intermediate gear adapted to engage with the driving element and with the mount to drive said mount from the driving element at two or more different speeds in relation to the driving element.

7. In a transmission gearing the combination of driving and driven elements, a movable mount, a gear system having one element thereof connected with the driving element, a second element thereof connected with the driven element and a third element thereof connected with the movable mount, means for restraining at will the motion of the mount, an intermediate gear adapted to engage with the driving element and with the mount, and means for mounting the intermediate gear independently of said gear system whereby said intermediate gear can be engaged at will with the driving element and with the mount to drive said mount from said driving element at two or more different speeds in relation to the driving element.

8. In a transmission gearing the combination of driving and driven elements, a movable mount, a gear system having one element thereof connected with the driving element, a second element thereof connected with the driven element and a third element thereof connected with the movable mount, an intermediate gear adapted to engage with the driving element and with the mount, means for bringing different parts of said intermediate gear adjacent to said driving element and to said mount and means for engaging and disengaging said intermediate gear with said driving element and said mount at will.

9. In a transmission gearing the combination of driving and driven elements, a movable mount, a gear system having one element thereof connected with the driving element, a second element thereof connected with the driven element and a third element thereof connected with the movable mount, an intermediate gear adapted to engage with the driving element and with the mount, means mounted independently of the gear system for bringing different parts of said intermediate gear adjacent to said driving element and to said mount and means also mounted independently of said gear system for engaging and disengaging said intermediate gear with said driving element and said mount at will.

10. In a transmission gearing the combination of driving and driven elements, a movable mount, a gear system having one element thereof connected with the driving element, a second element thereof connected with the driven element and a third element thereof connected with the movable mount, an intermediate gear having different diameter parts of its gear surface adapted to engage with the driving member and with the mount, and means to bring said different diameter parts of the gear surface of said intermediate gear into driving engagement with the driving member and mount.

11. In a transmission gearing the combination with driving and driven elements and a movable mount, of a shaft or axle longitudinally movable parallel with said driving and driven elements and means mounted on said shaft or axle for transmitting motion between said driving member and said movable mount at two or more different speeds in relation to the driving element.

12. In a transmission gearing the combination of a supporting framing, a driving element, a driven element, a gear system connected to said elements, a movable mount connected also to said gear system, a shaft or axle so carried by said framing that it may assume different positions parallel with the axis of the said driving and driven elements and movable mount, and means mounted on said shaft or axle for transmitting motion between said driving element and said movable mount independently of said gear system and at two or more speeds.

13. In a transmission gearing the combination of a gear system, a movable mount having connection with an element thereof, and means for restraining at will the motion of the mount, a friction gear having a friction surface through which driving effort can be transmitted at two or more different radii from the axis of its rotation for positively driving the mount independently of said gear system.

14. In a transmission gearing the combination of a gear system, a movable mount having connection with an element thereof, a friction gear for positively driving the mount independently of the gear system and means for moving different portions of said friction gear in and out of action at will by shifting the position of said gear's axis.

15. In a transmission gearing, the combination with driving and driven elements and a movable mount, of means for transmitting motion between the driving element and said mount at two or more different speeds in relation to the said driving element, said means including a roller having frictional contact with a part on the driving element and having its axis of rotation shiftable in relation to said parts.

16. In a transmission gearing the combination with driving and driven elements and a movable mount, of means for transmitting motion between the driving element and said mount at two or more different speeds in relation to the said driving element, said means including a roller having frictional contact with a part on the said mount and having its axis of rotation shiftable in relation to said parts.

17. In a transmission gearing the combination of a gear system, a movable mount having connection with an element thereof, and controllable means for positively driving the mount such means including a shaft movable both substantially parallel with and to different distances from the axis of said gear system and extending at an angle to the said axis.

18. In a transmission gearing the combination of a gear system, a movable mount having connection with an element thereof, a friction gear secured to the driving element, an intermediate friction gear engaging the first named gear and the mount and devices for carrying the intermediate friction gear whereby the said intermediate friction gear can be given both a movement substantially parallel with the axis of the gear system and a movement substantially at right angles to said axis to bring said intermediate friction gear into or out of engagement.

19. In a transmission gearing the combination with driving and driven elements of a gear system, a movable mount having connection with an element thereof, a member connected with the movable mount and forming a gear surface thereon through which driving effort can be transmitted, a second member connected with the driving element and likewise forming a gear surface on that element through which driving effort can be transmitted, an intermediate gear adapted to mesh with both said gear surfaces and means for moving said intermediate gear so that its axis of rotation may be brought either nearer to the gear surface on the member connected to the driving element or to the gear surface on the member connected to the mount and so that it can be brought into driving mesh with both said surfaces when in these different positions.

20. In a transmission gearing having driving and driven elements, the combination of a gear system, a movable mount having connection with an element thereof, and means, including an element rotatable about an axis movable substantially longitudinally to and separate from the axis of the gear system, for positively driving the mount from the driving element separately from the action of the gear system and at two or more different speeds.

21. In a transmission gearing the combination of a rotary driving element, a rotary driven element, a gear system having an element connected to each of said first named elements, a rotary mount having connection with still another element of the gear system, means for restraining at will the motion of the mount, and controllable means independent of the gear system for driving the said mount at two or more different speeds and in a direction opposite to that in which the driving element rotates but in the same direction as it is rotated by the gear system.

22. In a transmission gearing the combination with a driving element, a driven element and a gear mount, of means for connecting these two elements and the mount whereby when the mount is held from free rotation motion is transmitted between the said driving and driven elements and means of driving the gear mount from the driving member independent of said first mentioned connecting means and including a wheel having its axis of rotation at an angle to the axis of rotation of said driving and driven elements and being mounted so that it can be moved both parallel with its axis of rotation and at an angle thereto.

23. In a transmission gearing the combination with a rotary driving element, a rotary driven element and a rotary mount all turning about the same axis, means for connecting these two elements and the mount whereby when said mount is held from free rotation motion is transmitted between the driving and driven elements and means for driving the gear mount from the driving member independent of said first mentioned connecting means said means including a wheel movably mounted in relation to the aforementioned parts so that its axis of rotation can be brought nearer to or farther from one of the said elements.

24. In a transmission gearing the combination of rotary driving and driven elements, a gear system, a rotary mount having connection with an element thereof, an intermediate gear, means whereby the rotation of the intermediate gear can be communicated to said rotary mount and a member connected with said driving element and having a gear surface thereon through which driving effort can be transmitted to said intermediate gear to give said intermediate gear two or more different speeds in relation to the driving element through engaging the gear surface on the driving element member and the gear surface on the intermediate gear at two or more different radial distances from the center of rotation of said gear.

25. In a transmission gearing the combination of rotary driving and driven elements, an intermediate gear, means whereby the rotation of the driving element can be communicated to said intermediate gear, a gear system, a rotary mount having connection with an element thereof, means for restraining at will the rotation of the mount and a member connected with said mount and having a gear surface thereon through which driving effort can be transmitted from said intermediate gear to said rotary mount to give said rotary mount two or more different speeds in relation to the said intermediate gear through engaging the gear surface on the rotary mount member and the gear surface on the intermediate gear at two or more different radial distances from the center of rotation of said gear.

26. In a transmission gearing the combination with a rotary driving element, a gear on said element, a rotary driven element, a gear on said element, and a rotary gear mount, of a gear on said mount and a controllable means for restraining the motion of said mount and means separate from the said gear system for driving the mount from the driving element to rotate said mount at different speeds whereby the said driven member can either be caused to rotate or can be restrained from all rotation while still the driving element, the mount and the gear system are all in motion.

27. In a transmission gearing the combination with a rotary driving element, a rotary driven element, a rotary mount and intermeshing gears fastened on each of said elements and the mount, of a means for restraining the motion of said mount, a means for rotating the driving element to cause the said gears to revolve and the gear mount to rotate in the opposite direction to said driving element and controllable means separate from the gear system for connecting the driving element and the mount whereby said mount can be driven from said driving element at the same speed and in the same direction as said gears drive it, and thus hold the driven member from rotation, and whereby said mount can be driven at a different speed and in the same direction as said gears drive it to rotate the driven element.

28. In a transmission gearing the combination with a driving element, a driven element, a restrainable mount and a gear system connecting with said elements and said mount, of a clutch adapted to cause all said parts to turn as a unit, and a casing surrounding said gear system and carried by the driven element and means whereby said casing can be longitudinally adjusted parallel with the axis of said driven member to adjust the said clutch and means for locking the casing against said adjustment.

29. In a transmission gearing the combination with a driving element, a driven element and a restrainable mount of a clutch for locking all said parts together and preventing relative movement between them, a gear fastened to the driving element, a gear fastened to the restrainable mount and a gear rotatably mounted on the driven element and meshing with both the first mentioned gears and a casing, carried by said driven element, inclosing said gearing and movable longitudinally on said driven element to adjust said clutch.

30. In a transmission gearing the combination with a driving element, a driven element, a restrainable mount and a gear system connecting with said elements and said mount, of a clutch adapted to cause all said parts to turn as a unit, and a casing carried by said driven element and surrounding said gear system and having a part thereof threaded on said driven element whereby the casing can be longitudinally adjusted along the said driven member by rotating it about said member and means for locking it against said adjustment.

31. In a transmission gearing the combination with a driving element, a driven element and a restrainable mount, of a clutch adapted to cause all said parts to turn as a unit, a gear fastened to the driving element, a gear fastened to the restrainable mount and a gear rotatably mounted on the driven element and meshing with both the first mentioned gears, a part on the driven element projecting between the said gear on the driving element and the said gear on the mount, a threaded extension of said part projecting beyond the plane of said gears and leaving an opening of larger diameter than one of them and means to prevent the admission of dirt to said gearing comprising a casing having a part threaded into said extension said casing surrounding said gearing and being releasably locked to said driven element to normally turn with said element.

32. In a transmission gearing the combination with a driving element, a driven element and a restrainable mount, of a clutch adapted to cause all said parts to turn as a unit, a gear fastened to the driving element, a gear fastened to the mount and a gear rotatably mounted on the driven element and meshing with the two first mentioned gears, a part on the driven element projecting between the said gear on the driving element and the said gear on the mount and having a portion of its circumference cut away to admit the said gear mounted on the driven element, a bearing bushing for the said gear carried by the driven element said bushing being of larger diameter than this gear and fitting a socket in the said driven element of larger diameter than this said gear whereby to permit of its passage through the socket opening and a casing threaded concentrically with the axis of said driven element into a threaded extension of said part of said element and means whereby the threaded opening in said extension can be larger than one of the aforesaid element gears consisting of cutting away the said bushing of the gear on the driven member at one side.

33. In a transmission gearing the combination with a driving element, a driven element and an organized planetary gear system connected thereto, a casing surrounding said gear system and mounted on the driven element, a restrainable mount outside said casing and having connection also with an element of said planetary gear system within the casing and means by which the rotation of said casing on said driven element adjusts said casing to different positions parallel with the axis of said driven element and means for locking said casing to said driven element to prevent such adjustment.

34. In a transmission gearing the combination with a driving element, a driven element, an organized planetary gear system having gears thereof connected with each of these elements and a clutch for causing all said parts to turn as a unit, of a casing surrounding and inclosing said gear system and mounted on said driven element and having a portion thereof acting as a member of said clutch, a restrainable mount outside said casing and having connection also with a gear of said planetary gear system within the casing, means whereby said casing can be adjusted to different positions longitudinally along the axis of said driven element and for locking the casing to said element to prevent said adjustment, and a controllable means whereby all the aforesaid parts, excepting the driving element and its connected gear, can be moved axially along the said driving element to engage and disengage said clutch at will.

35. In a transmission gearing the combination with a driving element, a driven element, an organized planetary gear system having gears thereof connected with each of these elements and a clutch, of a casing surrounding and inclosing said gear system and mounted on said driven element, a restrainable mount outside said casing and having connection also with a gear of said planetary gear system within the casing, means whereby said casing can be adjusted to different positions longitudinally along the axis of said driven element and for locking the casing to said element to prevent said adjustment, a part on said casing forming one member of said clutch, a part on said driving element forming the other member of said clutch, and controllable means for engaging said clutch, to cause all said parts to turn as a unit, comprising a longitudinally movable collar, clutch dogs mounted on the driven element and operated by the collar and means whereby the operation of said clutch causes a thrust pressure against a part of the said driving element and forces the said driven element and its casing and clutch part longitudinally into forcible engagement with the clutch part on the driving element.

36. In a transmission gearing the combination with a driving element, a driven element and a restrainable mount, of a gear on the driving element, a second gear meshing with said first gear rotatably mounted on the driven element and eccentric to the axis thereof, a third gear also meshing with said second gear and carried by said restrainable mount, means whereby motion can be transmitted between the driving and driven elements through the action of said gears and a clutch for connecting said driving and driven elements together to turn as a unit without causing driving pressure on the said gears and acting independently of them.

37. In a transmission gearing the combination with a driving element, a driven element, an organized planetary gear system having a gear thereof connected with each of these elements, of a clutch for causing all said parts to turn as a unit adjacent to said gear system, a restrainable mount having connection also with a gear of said gear system, a framing supporting said gearing, a bearing attached to said framing and surrounding and supporting said driven element and adjacent to said gear system and a controllable means on the opposite side of said bearing from said gear system and clutch for longitudinally sliding said driven member and parts thereon to engage said clutch.

In testimony whereof I have signed my name to this specification in the presence of two subscribing witnesses.

ALDEN E. OSBORN.

Witnesses:
OLIVER CONGDON,
T. WALTER MARTIN.